Patented Aug. 18, 1925.

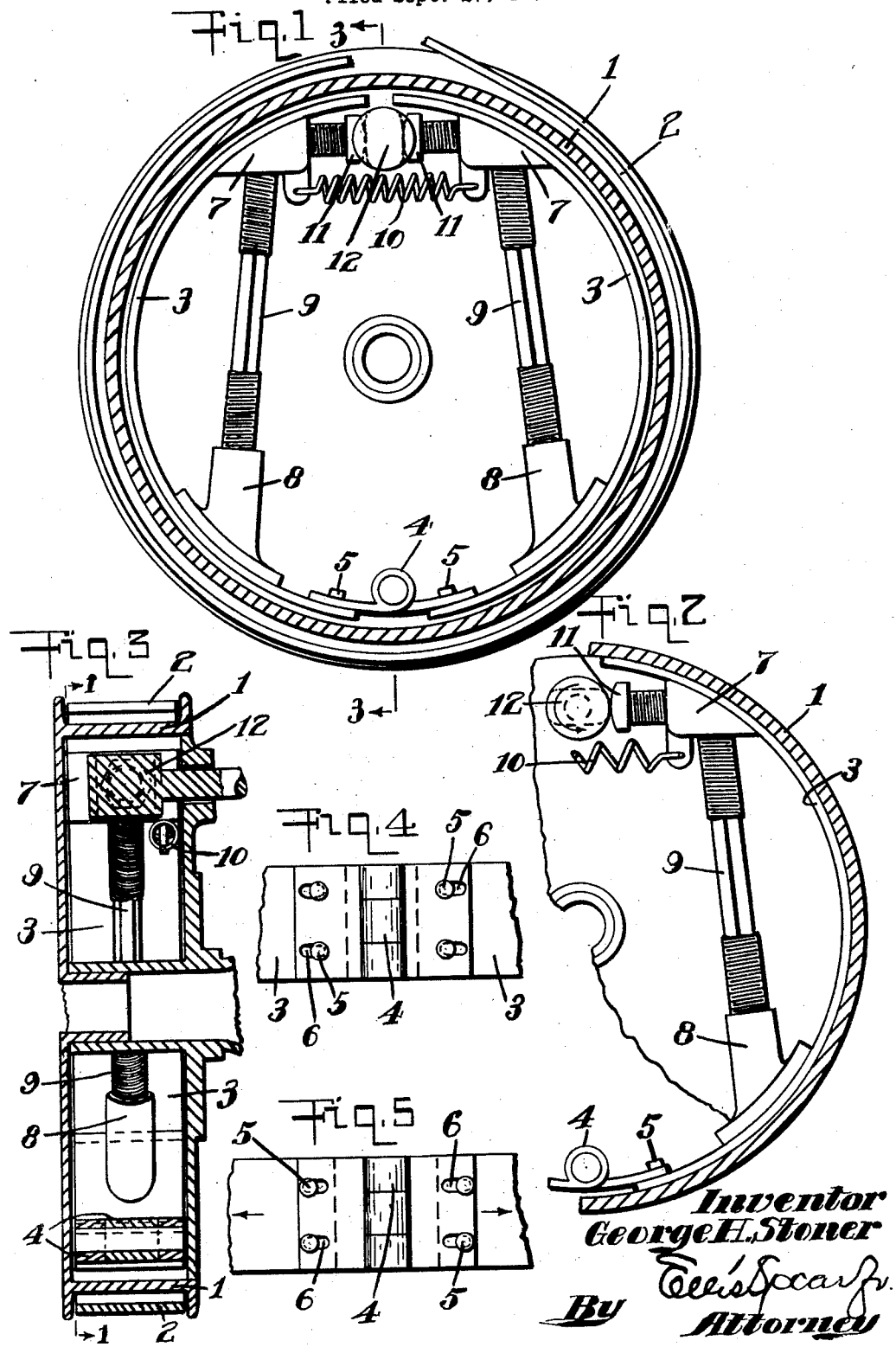

1,550,398

UNITED STATES PATENT OFFICE.

GEORGE H. STONER, OF EAST BOSTON, MASSACHUSETTS.

VEHICLE BRAKE.

Application filed September 27, 1924. Serial No. 740,205.

*To all whom it may concern:*

Be it known that I, GEORGE H. STONER, a citizen of the United States, residing at East Boston, county of Suffolk, Commonwealth of Massachusetts, have invented certain new and useful Improvements in Vehicle Brakes, of which the following is a specification.

My invention as herein involved relates to brakes and particularly to those makes of expanding type such as are installed in automobiles and like vehicles.

Much difficulty has been experienced with such brakes in regard to inequalities of wear and difficulties of adjustment with the result that it has been difficult, if not impossible, to keep up the efficiency of such brakes over any reasonable period of time.

In such brakes much difficulty has been experienced in devising expansion members which would under given conditions apply uniform or nearly uniform radial resistance to the brake drum. To supply such a brake and such an internal expansion apparatus has been the urge of my thought. I have provided for general principles and at the same time have devised specific apparatus of immediate and practical utility in solving some of the brake problems of standard automobile construction as appears in automobile use.

In accordance with my invention I am able to provide a simple and effective brake having a great uniformity of bearing surface and having a wide range of adjustment which can be very easily made to take up such wear as is inevitable.

My invention is therefore to be considered not only as a brake but as a braking mechanism capable of installation or substitution in existing cars and particularly in certain cars to which its immediate applicability will be obvious to those skilled in the art.

As illustrative of my invention I have shown in the accompanying drawings a form of brake which I have found to be very efficient and one which can be readily embodied in a new car or substituted in an old car without any increase in expense and with a considerable ultimate saving. Throughout the specification and drawing like reference characters are employed to indicate corresponding parts, and in the drawings:—

Fig. 1 is a side elevation partly in section of brake in accordance with my invention.

Fig. 2 a fragmentary detail thereof.

Fig. 3 a central vertical section, and

Figs. 4 and 5 details of hinge construction.

I have indicated at 1 the usual brake drum of an automobile wheel, and at 2 the usual external contracting band operating thereon. Within such a drum I provide as an expansion member a construction which is in part rigid and in part flexible, as will be hereinafter described.

Primarily, my expansion member consists of flexible or resilient bands or strips 3, 3 which are united by a hinge member 4 to which they are loosely connected by studs 5 working in slots 6. On each one of the bands 3 I rivet a pair of members 7 and 8. The member 8 is tapped to receive a reversely threaded adjusting screw 9 the other end of which is tapped into the member 7 so as to provide for the adjustment of these members. The two members 7 are yieldingly held in contracted position by a spring 10. The members 7 are also tapped to receive bearing studs 11 adapted to be contacted by an operating cam 12 which is rocked in the usual manner to expand the brake structure to give braking contact with the drum 1.

When properly adjusted my brake gives great uniformity of contact and consequently uniformity of wear. It, however, is naturally subject to ultimate wear of the linings and when such wear necessitates adjustment the expansion member may be restored to its original perfection of adjustment by inserting between the bearing studs 11 a block of the major thickness of the cam 12 and in then taking up on the adjustment screw 9 until the bands 3 have been brought out to a true circular shape.

The inevitable wear under the action of the cam 12 may be readily adjusted by the studs 11 so that no shimming or welding of additional bearing surface is required.

During the adjustment of the segments 3 the studs 5 are seated in the bottom of their slots 6 as indicated in Fig. 4. When, however, the cam 12 is actuated forcing out the block 7, the resultant force through the connection 9 will move out the block 8. This results in a somewhat radial movement and the bands 3 are permitted to respond to this movement by the play of the studs 5 in their slots 6 as illustrated in Fig. 5.

My expansion members may be substituted in certain standard brakes replacing more cumbersome rigid parts. All that is necessary to do is to remove these specific rigid expansion members and substitute my strips 3, slipping the hinge member 4 over the usual pintle and adjusting the bearing studs 11 to proper operative position with the operating cam. This replacement can be made in less time and with less expense than is required in relining and readjusting certain standard brakes which do not have uniform bearing nor an internal adjustment.

Various modifications may obviously be made in the design of the blocks and the character of the adjustments, all without departing from the spirit of my invention if within the limits of the appended claims.

What I therefore claim and desire to secure by Letters Patent is:—

1. In a brake of the class described, an expansion member comprising a pair of flexible band segments hinged together at one end of each, a block permanently connected adjacent the ends of each of said segments, and an adjustable rigid strut between the block pairs of each segment, and an operating bearing on the end blocks of each segment and disposed in opposition to each other.

2. In a brake of the class described, an expansion member comprising a pair of flexible band segments hinged together at one end of each, a block permanently connected adjacent the ends of each of said segments, and an adjustable rigid strut between the block pairs of each segment, and an adjustable bearing piece carried by the end blocks of each segment and disposed in opposition to each other.

3. In a brake of the class described, an expansion member comprising a hinge, and a pair of flexible band segments connected thereto, a block permanently connected adjacent the ends of each of said segments, and an adjusting strut threaded in block pairs of each segment, and an adjustable bearing piece threaded into the end blocks of each segment and disposed in opposition to each other.

4. In a brake of the class described, an expansion member therein including a flexible segment, a block permanently connected adjacent the end of said segments, and an adjustable rigid strut between the block pairs of the segment.

5. In a brake of the class described, an expansion member therein comprising a flexible member and a pair of rigid members permanently connected adjacent the ends of said flexible member, and an adjustable rigid strut between the rigid members.

6. In a brake of the class described, an expansion member therein comprising a pair of flexible band segments hinged together at one end, a block permanently connected adjacent the free ends of each of said segments, and an adjustable bearing piece threaded into the end blocks of each segment and disposed in opposition to each other and adapted to be contacted by the cam.

7. In an expansion member for a brake, an internal contact arc member, and means for positively adjusting the effective radius thereof.

8. In an expansion member for a brake, an internal flexible contact arc member, and means for positively adjusting the curvature thereof.

9. In a brake, a brake drum, and an internal friction shoe including an arc member, and means for positively adjusting the effective radius of said arc member.

10. In a brake, a drum, and an internal friction shoe including a flexible arc member, and means for positively adjusting the curvature of said arc member.

11. An internal expansion member for a brake, comprising a flexible arc member, and a rigid adjustable cord member.

12. In a brake, an internal contact piece including an arc member, and means for adjusting its effective contact radius.

13. In a brake, a brake drum, and an internal friction shoe including an arc member loosely pivoted adjacent the periphery of said drum, means for positively adjusting the effective radius of such arc member, a shoe operating member, and means for providing circumferential adjustment between said operating member and said arc member.

14. In a brake, a brake drum, and an internal friction shoe including an arc member loosely pivoted adjacent the periphery of said drum, a cam operating device contactable with one end of said arc member to expand the same, said shoe having limited circumferential freedom relative to said pivot.

In testimony whereof I affix my signature.

GEORGE H. STONER.